(12) United States Patent
Fielibert et al.

(10) Patent No.: US 8,887,218 B2
(45) Date of Patent: Nov. 11, 2014

(54) SYSTEMS AND METHODS OF ADJUSTING BANDWIDTH AMONG MULTIPLE MEDIA STREAMS

(76) Inventors: Jan Maurits Nicolaas Fielibert, Oeselgem (BE); James Eugene Cannella, Jr., Roswell, GA (US)

( * ) Notice: Subject to any disclaimer, the term of this patent is extended or adjusted under 35 U.S.C. 154(b) by 474 days.

(21) Appl. No.: 11/946,911

(22) Filed: Nov. 29, 2007

(65) Prior Publication Data

US 2009/0144792 A1    Jun. 4, 2009

(51) Int. Cl.

| | |
|---|---|
| H04N 7/173 | (2011.01) |
| H04N 21/236 | (2011.01) |
| H04N 21/2365 | (2011.01) |
| H04N 19/14 | (2014.01) |
| H04N 19/164 | (2014.01) |
| H04N 19/152 | (2014.01) |
| H04N 19/115 | (2014.01) |
| H04N 19/149 | (2014.01) |
| H04N 19/124 | (2014.01) |
| H04N 21/434 | (2011.01) |
| H04N 19/61 | (2014.01) |
| H04N 19/40 | (2014.01) |

(52) U.S. Cl.
CPC ... *H04N 19/00781* (2013.01); *H04N 21/23608* (2013.01); *H04N 21/23655* (2013.01); *H04N 19/00157* (2013.01); *H04N 19/00236* (2013.01); *H04N 19/00193* (2013.01); *H04N 19/0006* (2013.01); *H04N 21/2365* (2013.01); *H04N 19/00181* (2013.01); *H04N 19/0009* (2013.01); *H04N 21/4344* (2013.01); *H04N 21/4347* (2013.01); *H04N 19/00472* (2013.01)
USPC .................. 725/95; 725/91; 725/93; 725/96; 725/116

(58) Field of Classification Search
None
See application file for complete search history.

(56) References Cited

U.S. PATENT DOCUMENTS

| | | | | |
|---|---|---|---|---|
| 5,905,522 | A * | 5/1999 | Lawler | 725/131 |
| 6,240,103 | B1 * | 5/2001 | Schoenblum et al. | 370/468 |
| 6,611,503 | B1 * | 8/2003 | Fitzgerald et al. | 370/260 |
| 6,721,789 | B1 * | 4/2004 | DeMoney | 709/219 |
| 7,617,516 | B2 * | 11/2009 | Huslak et al. | 725/95 |
| 2003/0081595 | A1 * | 5/2003 | Nomura et al. | 370/353 |
| 2004/0221312 | A1 * | 11/2004 | Kobayashi | 725/105 |
| 2005/0198682 | A1 * | 9/2005 | Wright | 725/96 |
| 2006/0095943 | A1 | 5/2006 | Demircin et al. | 725/81 |
| 2006/0253883 | A1 * | 11/2006 | Giammaressi | 725/95 |
| 2008/0205389 | A1 * | 8/2008 | Fang et al. | 370/389 |
| 2010/0077427 | A1 * | 3/2010 | Helms et al. | 725/32 |

OTHER PUBLICATIONS

Chinese First Office Action dated Jan. 31, 2012 cited in Application No. 200880117866.3, 17 pgs.
Chinese Second Office Action dated Nov. 5, 2012 cited in Application No. 200880117866.3, 19 pgs.

(Continued)

*Primary Examiner* — Nasser Goodarzi
*Assistant Examiner* — Fred Peng
(74) *Attorney, Agent, or Firm* — Merchant & Gould

(57) ABSTRACT

Disclosed herein are systems and method for adjusting bitrate among multiple media streams delivered on a common subscriber connection. One such method comprises receiving information describing a maximum bitrate provisioned on the subscriber connection, and receiving a plurality of media streams. Each media stream utilizes a corresponding bitrate, and the plurality of media streams has a combined bitrate. The method also comprises adjusting the bitrate of at least a portion of the plurality of media streams so that the combined bitrate is related to the maximum bitrate provisioned on the subscriber connection.

20 Claims, 6 Drawing Sheets

(56) References Cited

OTHER PUBLICATIONS

Chinese Rejection Decision dated Apr. 25, 2013 cited in Application No. 200880117866.3, 21 pgs.

European Office Action dated Jul. 3, 2014 cited in Application No. 08 856 008.1, 6 pgs.

Eun-Chan Park et al., "Improving Quality of Service and Assuring Fairness in WLAN Access Networks," IEEE Transactions on Mobile Computing, vol. 6, No. 4, pp. 337-350, Apr. 2007.

* cited by examiner

SYSTEMS AND METHODS OF ADJUSTING BANDWIDTH AMONG MULTIPLE MEDIA STREAMS

CROSS REFERENCE TO RELATED APPLICATIONS

Not applicable.

FIELD OF THE DISCLOSURE

The present disclosure relates to electronic devices, and more specifically, to systems and methods for adjusting bandwidth among multiple media streams.

BACKGROUND

A growing number of consumers now have high speed, or broadband, connections to the Internet in their homes. Generally, a consumer receives an Internet access service through this broadband connection, which allows one or more personal computers to access the Worldwide Web and other Internet resources. In addition to this data service, the increased bandwidth provided by a broadband connection allows providers to deliver other media services, such as telephone, digital television, and/or video, to a multimedia terminal adapter (MTA) or a digital home communication terminal (DHCT) located in the home.

These data and media services share the bandwidth of the subscriber's broadband connection. In the case of broadband video or music services, individual programs received by a subscriber are made of a collection of media streams that combine into a single user experience. For example, a video program includes video and audio streams, and can also include one or more data streams. Each of these programs uses a certain amount of bandwidth, where this bandwidth is proportional to the picture quality. Thus, a specific amount of bandwidth is required to support, for example, a broadband video service carrying one High Definition (HD) program and two Standard Definition (SD) programs. Furthermore, this bandwidth requirement can be viewed as three different requirements, for instantaneous demand, average demand, and maximum demand.

Generally, some subscriber broadband connections support more bandwidth than others. Often, available subscriber bandwidth depends on loop length (the distance between the subscriber location and the service provider's transmission equipment). Thus, the amount of video programming which can be delivered to subscribers depends on the characteristics of the subscriber connection. However, provider networks are conventionally built so that every subscriber connection supports a guaranteed minimum bandwidth, and then the provider delivers content which is limited to this minimum. Thus, a subscriber with a connection that could receive 30 Mbits is limited by the subscriber that can only receive 25 Mb/s. Therefore, a need arises to address this and other deficiencies.

SUMMARY

Disclosed herein are systems and method for adjusting bitrate among multiple media streams delivered on a common subscriber connection. One such method comprises receiving information describing a maximum bitrate provisioned on the subscriber connection, and receiving a plurality of media streams. Each media stream utilizes a corresponding bitrate, and the plurality of media streams has a combined bitrate. The method also comprises adjusting the bitrate of at least a portion of the plurality of media streams so that the combined bitrate is related to the maximum bitrate provisioned on the subscriber connection.

One such system comprises logic configured to determine a maximum bitrate provisioned on the subscriber connection and logic configured to receive a plurality of media streams. Each media stream utilizes a corresponding bitrate. The plurality of media streams has a combined bitrate. The system further comprises logic configured to adjust the bitrate of at least a portion of the plurality of media streams so that the combined bitrate is related to the maximum bitrate provisioned on the subscriber connection.

Another such system comprises a plurality of transrating engines. Each transrating engine receives a corresponding input stream having a bitrate, and each produces a corresponding output stream having an adjusted bitrate. The system further comprises a statistical rate controller configured to inform each of the plurality of transrating engines as to the corresponding adjusted bitrate. The system further comprises maximum bitrate determination logic configured to receive an indication of maximum bitrate supported on the subscriber line and to inform the statistical rate controller as to the maximum bitrate. The statistical rate controller is further configured to determine the adjusted bitrate of each transrating engine such that the combined bitrate of the output streams is less than the maximum bitrate.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
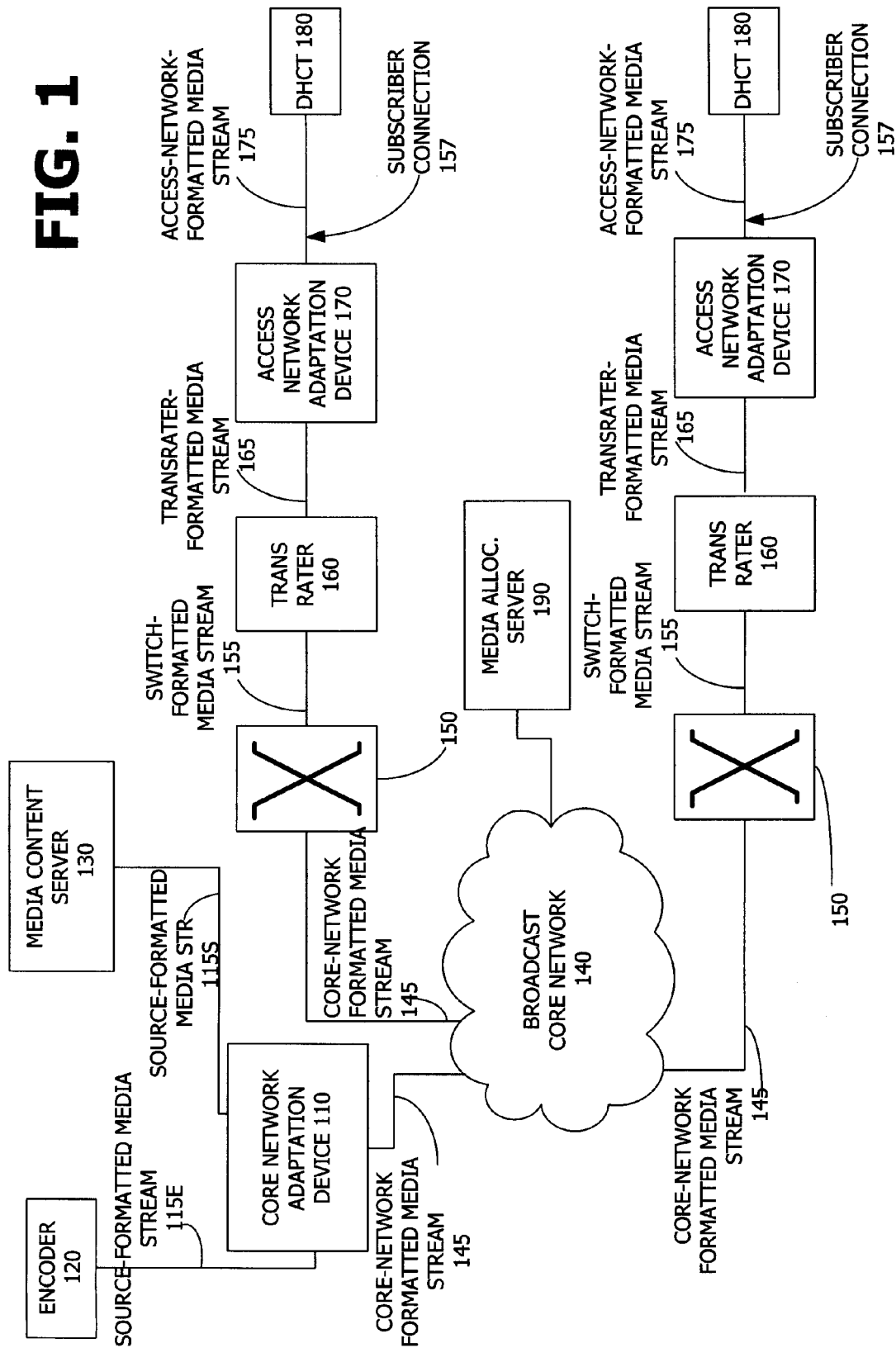
FIG. 1 is a block diagram of an environment in which one embodiment of a system and method for adjusting bandwidth among multiple media streams is located.

FIG. 1 is a block diagram of an environment in which one embodiment of a system and method for adjusting bandwidth among multiple media streams is located. A core network adaptation device 110 receives one or more digital source-formatted media streams 115 for delivery to various subscribers. In this disclosure, the term "media stream" refers to a stream that includes video frames, audio frames, hypermedia, multimedia, or any combination thereof. Common encoding formats for source-formatted media streams 115 include MPEG-2, MPEG-4, and VC-1. In some environments, the encoded media stream represents a single program, and thus contains a video and an audio stream multiplexed together into a single program transport stream (SPTS).

Source-formatted media streams 115 can be provided from various sources. In the example environment of FIG. 1, source-formatted media stream 115E is provided by an encoder 120 which encodes an analog signal from a media content source, such as a cable network or an on-air television station, and source-formatted media stream 115S is provided from a digital media content server 130. Other ways of providing source-formatted media streams 115 to core network adaptation device 110 should be familiar to a person of ordinary skill in the art, and are intended to be within the scope of this disclosure.

Core network adaptation device 110 prepares source-formatted media streams 115 for transport over a core network 140. Though the details of this adaptation depend on the type of core network, the adaptation generally involves encapsulating program streams into packets, using broadcast addressing for the packets, and combining packet program streams. The result is a core-network-formatted media stream 145 containing more than one program stream and that is suitable for transport across core network 140.

A person of ordinary skill in the art should be familiar with the concept and practice of encapsulating information into packets, and with multicast and broadcast addressing techniques, so these features will not be discussed further in this disclosure. Such a person should understand that multicast or broadcast techniques can be used, as appropriate to the particular transport network used. In one embodiment, MPEG Transport Stream (TS) packets are encapsulated within layer-3 Internet Protocol (IP) packets. In another embodiment, the MPEG TS packets are encapsulated within real-time transport protocol (RTP) packets, which are in turn encapsulated within IP packets. In another embodiment, VC-1 streams are used rather than MPEG streams.

Multiple programs carried within core-network-formatted media stream 145, destined for many different subscribers, are transported over core network 140, and delivered to switches 150 located at the network edge. A person of ordinary skill in the art should understand that switching is typically performed at layer 3 or layer 2, but can be performed at any layer. Each switch 150 selects, for a particular subscriber, a subset of programs carried in core-network-formatted media stream 145, and produces a switch-formatted media stream 155, addressed to that subscriber. In some embodiments switch-formatted media stream 155 uses multicast addresses, while in other embodiments unicast addresses are used. A person of ordinary skill in the art should be familiar with the use of multicast and unicast addresses to deliver packets to groups of subscribers and single subscribers, respectively. Such a person should also understand that a multicast group allows for as few as one subscriber, and that multicast can also be achieved by replication of unicast streams.

This combination of broadcast and switched techniques makes efficient use of bandwidth. The relatively high-bandwidth core network 140 uses broadcast techniques to efficiently deliver multiple programs, destined for delivery to many different subscribers, to the edge of the network. Multiple switches 150 receive core-network-formatted media stream 145, carrying all the broadcast programs. Each switch 150 determines which program or subsets of programs in core-network-formatted media stream 145 are delivered to those subscribers connected to switch 150 via a subscriber connection 157.

Each subscriber connection 157 is provisioned for a maximum amount of bandwidth. This per-subscriber maximum bandwidth is related to characteristics of subscriber connection 157. Some of these characteristics relate specifically to the performance capabilities of subscriber connection 157 itself, such as the physical medium of subscriber connection 157 or the loop length of subscriber connection 157. Other characteristics, such as the price paid by the subscriber for the delivered media service(s), relates to the enforced, rather than the hypothetical, maximum bandwidth. Before delivery to a subscriber via a subscriber connection 157, the bitrate of switch-formatted media stream 155 is adjusted by a transrater 160 to match the maximum bandwidth provisioned on that subscriber connection 157. More specifically, transrater 160 adjusts the bitrate of one or more individual streams within switch-formatted media stream 155, to produce a transrater-formatted media stream 165.

Transrater 160 will be discussed in further detail below. However, some general characteristics will be described here. Notably, a transrater 160 produces a transrater-formatted media stream 165 having a total bitrate related to the maximum bitrate allowed on subscriber connection 157. A person of ordinary skill in the art should understand that the bandwidth on subscriber connection 157 can be shared by other streams also (e.g., data streams used for Internet access, voice streams used for telephony, etc.). Therefore, the total bitrate of the stream produced by transrater 160 can be less than the maximum subscriber bandwidth, thus leaving room for other streams. In this case, the bitrate of the stream output by transrater 160 can be equal to the maximum subscriber bandwidth minus a bandwidth amount reserved for other streams. Note that even in this case, the adjusted stream bitrate is related to the maximum subscriber bandwidth.

Transrater-formatted media stream 165 is generally provided to an access network adaptation device 170, which prepares the transrater-formatted media stream 165 for travel over subscriber connection 157. The details of the adaptation vary depending on the type of subscriber connection 157 and on the subscriber equipment. In general, access network adaptation device 170 converts between the protocols used by switch 150 (e.g., high speed Ethernet) and the protocols used on subscriber connection 157 (e.g., DSL, HFC). Some embodiments of access network adaptation device 170 also perform encapsulation, de-encapsulation, or both (as when converting from one packet format to another). Some embodiments act as a multiplexer to combine additional streams such as a voice stream or a data stream. Some embodiments of access network adaptation device 170 are integrated with transrater 160.

An access-network-formatted stream 175 produced by access network adaptation device 170 is transmitted over one of subscriber connections 157 to a digital home communication terminal (DHCT) 180. A DHCT 180 receives access-network-formatted stream 175, and decodes the individual program streams carried within to produce a video signal. DHCT 180 supplies the video signal to a display (not shown) for viewing by the customer. In one embodiment, the display is a television. In another embodiment, the display is a computer monitor. In some embodiments, DHCT 180 also decodes an audio stream and produces an audio signal which accompanies the video signal.

As explained earlier, a subset of program streams is selected by switch 150 for delivery to a particular subscriber. In some embodiments, DHCT 180 communicates with a media allocation server 190 to request that particular program streams be included in stream 175 received by that subscriber. In one example scenario, DHCT 180, in response to a user request to watch the FOX network, requests a program stream corresponding to FOX from media allocation server 190.

Media allocation server 190 in turn requests switch 150 serving that subscriber to include the FOX program stream in access-network-formatted stream 175 delivered to that DHCT 180 over subscriber connection 157. In other embodiments, media allocation server 190 is not present, and DHCT 180 requests the program from switch 150.

Figure 2:
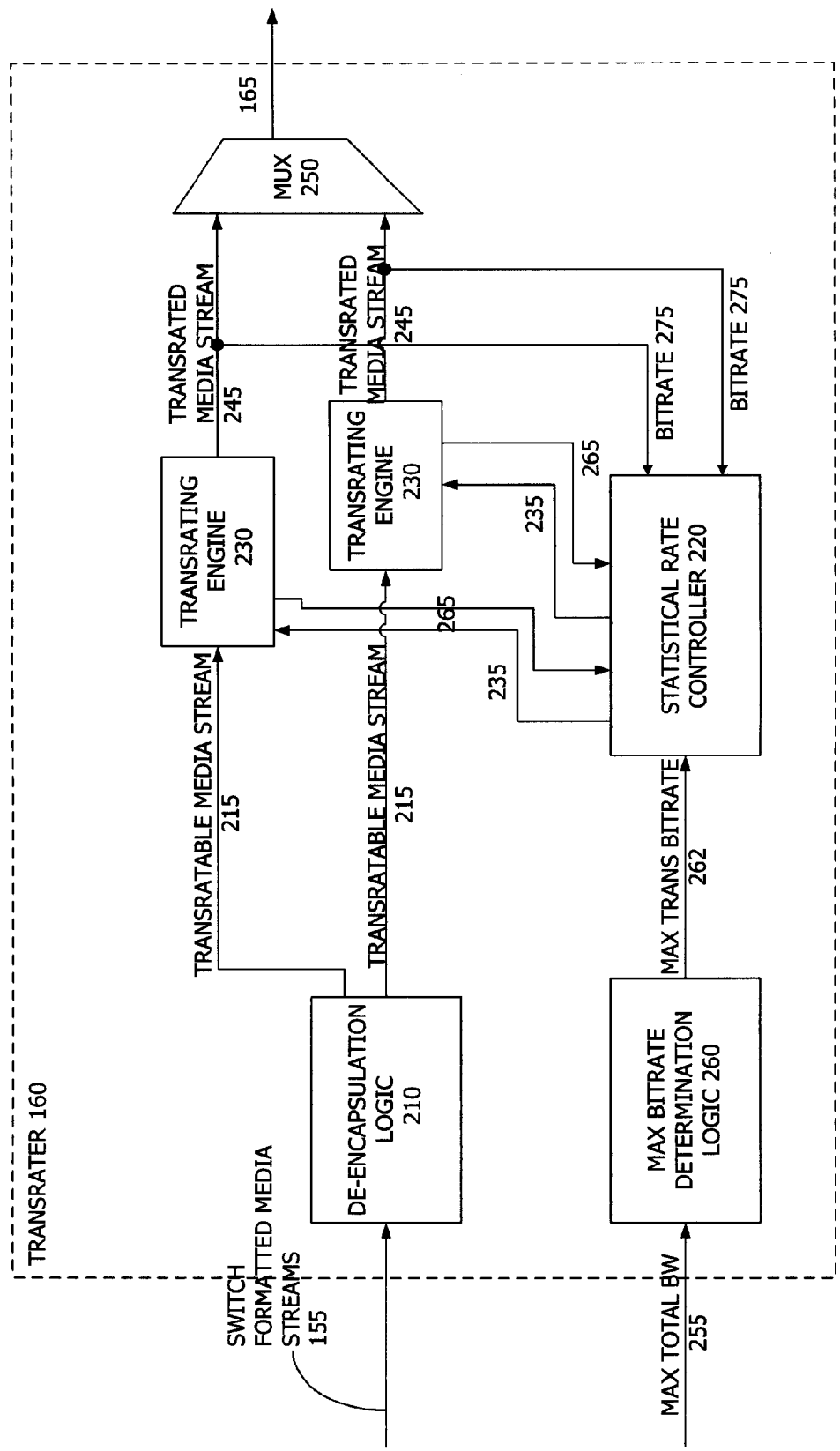
FIG. 2 is a block diagram of an embodiment of the transrater from FIG. 1.

FIG. 2 is a block diagram of transrater 160 from FIG. 1 which adjusts bandwidth on a subscriber connection 157 to match the maximum bitrate supported on that connection. As described earlier, transrater 160 receives various media streams addressed to a particular subscriber. (The programs can be addressed to the subscriber as an individual entity, or as part of a group of subscribers receiving the same programs.) In addition to carrying multiple media streams, received switch-formatted media stream 155 encapsulates the media streams. Therefore, transrater 160 includes de-encapsulation logic 210 on the receiving side to extract the payload of switch-formatted media stream 155 and produce individual transratable media streams 215. Transratable media stream 215 is formatted so as to give a transrating engine operable access to that information within the media stream that contributes variably to the bandwidth consumed by the media stream.

A person of ordinary skill in the art should realize that the details of de-encapsulation depend on the type of transport used. De-encapsulation logic 210 can, for example, remove Ethernet, IP, and UDP encapsulations and provide MPEG Transport Stream packets to transrater engine 230. As another example, MPEG Program Stream Packets can be provided to transrating engine 230. In yet a third example, de-encapsulation logic 210 can be implemented so as to additionally remove MPEG packetization and thereby provide video and audio sample data, and optionally metadata regarding timing, framing, or other parameters, directly to transrating engine 230. According to the particular embodiment, this sample data could be provided with or without entropy coding removed, and with or without any subset of decode operations having been already performed by de-encapsulation logic 210 or having been left to be performed by the transrating engine 230.

Transrater 160 includes a statistical rate controller 220. The general principles of statistical rate control, also called statistical multiplexing, should be familiar to a person of ordinary skill in the art, but will be briefly discussed here. Statistical rate control starts with a predefined amount of bandwidth and a group of encoded streams which are to be transmitted within that bandwidth. Statistical rate controller 220 takes advantage of probabilities which apply when programs from different sources are grouped together: at any particular point in time there is a statistical probability that some programs are encoding highly complex content while others are not. Statistical rate controller 220 makes real-time decisions about the bitrate requirements for each program, awarding each program a bitrate consistent with its immediate needs: programs with content that is less complex, or easier to encode, give bandwidth to programs with more complex material. Statistical rate controller 220 maintains a constant total bandwidth while varying the bitrate of individual programs in the group.

Now that the concepts of statistical rate control have been introduced, transrating engine 230 will be discussed in further detail. The extracted transratable media streams 215 are provided to one or more transrating engines 230, each of which adjusts the bitrate of a corresponding media stream 215 to match a bitrate parameter 235 that is provided by statistical rate controller 220. Transrating engines 230 produce transrated media streams 245, which are combined by multiplexer 250 to produce transrater-formatted media stream 165.

Transrater 160 receives information 255 about a maximum bitrate available for transrated streams, and operates to keep the total bitrate of transrater-formatted media stream 165 within a constant bitrate (CBR) envelope which is less than this maximum. (This result will be explained in more detail in connection with FIG. 4.)

A transrated media stream 245 is modified by a transrating engine 230 so as to change the instantaneous bandwidth consumed by the stream. For example, the information within the media stream that contributes variably to bandwidth may be modified in value, quantization level, frequency content, or emission time, or in other ways that will be familiar to a person of ordinary skill in the art. Such a person should also appreciate that at certain times or for certain streams, it may not be necessary to perform this modification if the instantaneous consumed bandwidth is satisfactory, and in such cases modification may not occur during all or part of those time periods.

Transrated media stream 245 is formatted so as to be compatible with the operation of multiplexer 250. For example, some embodiments of transrating engine 230 provide MPEG Transport Streams to multiplexer 250. Other embodiments of transrating engine 230 provide MPEG Packetized Elementary Streams to multiplexer 250. Other mechanisms for formatting transrated media stream 245 are also possible according to the chosen embodiment of multiplexer 250, and will be familiar to persons of ordinary skill in the art.

The program streams produced by transrater 160 share bandwidth on subscriber connection 157 with other streams, such as data and/or voice streams used by Internet data access services and telephony services, respectively. Maximum bitrate determination logic 260 thus determines the maximum transrater bitrate 262 starting from a maximum other streams. In some embodiments, however, no other streams are allowed, and so maximum transrater bitrate 262 is the same as maximum total bandwidth 255 allowed on subscriber connection 157. Two other embodiments of maximum bitrate determination logic 260 will be discussed later in connection with FIGS. 4 and 5.

A transrating engine 230 performs bitrate adjustment by at least partially decoding and then re-encoding program stream 215 to produce a re-rated media stream 245 having a bitrate that matches a bitrate parameter 235 provided by statistical rate controller 220. The re-encoding process produces complexity information 265 which describes the frames as they are encoded, and complexity information 265 is provided, at least periodically, to statistical rate controller 220. Statistical rate controller 220 monitors the bitrate 275 of each transrated media stream 245 that is output by transrating engines 230. Using this per-stream bitrate information 275 in combination with complexity information 265, statistical rate controller 220 trades bandwidth between transratable media streams 215: typically, the bitrate of transratable media streams 215 that are currently less complex (or easier to encode) is decreased, and the bitrate of those transratable media streams 215 that are currently more complex (or harder to encode) is increased.

Figure 3:
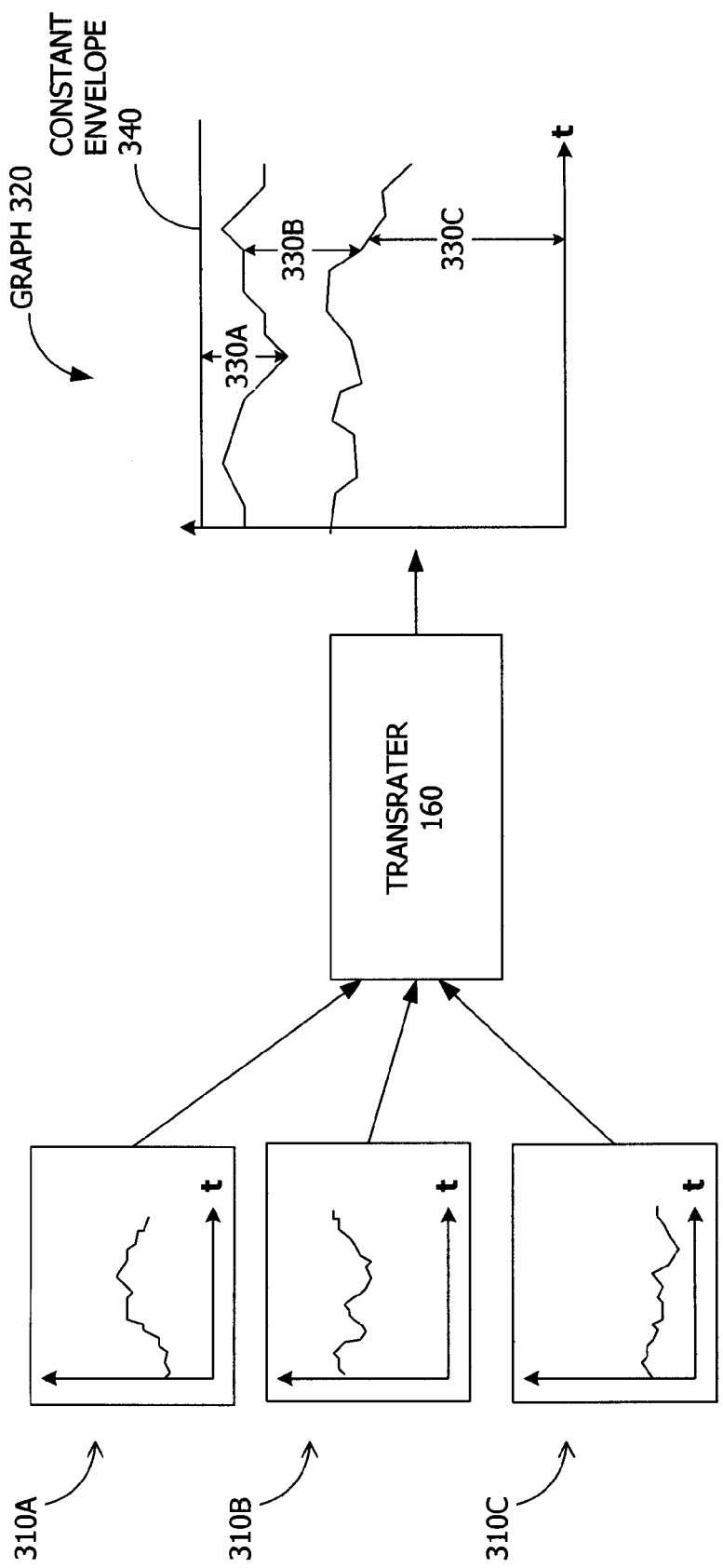
FIG. 3 is a diagram depicting the constant bitrate envelope produced by the statistical rate controller from FIG. 2.

FIG. 3 is a diagram depicting the constant bitrate envelope produced by transrater 160. In this example, three media streams are provided as input to transrater 160. Each of input media streams is a variable bit rate (VBR) stream, with a bitrate vs. time relationship shown in graphs 310A-C. As can be seen in graphs 310A-C, the peaks and valleys occur at different times in the three different transratable media streams 21 SA-C: typically, when the media stream in graph 310A is at a peak, the peaks in graphs 310B and 310C are lower; the media stream of graph 310B peaks at a different time than the media stream of graph 320C. Graph 320 shows the individual bitrate over time for th combined re-rated streams: span 330A represents the bitrate of stream 215A (corresponding to 310A); span 330B represents the bitrate of stream 215B (corresponding to 310B); span 330C represents the bitrate of stream 215C (corresponding to 310C). The cumulative bitrate is kept within an envelope 340 by statistical rate controller 220.

As described above, transrater 160 operates to keep the combined re-rated stream 245 within a maximum transrater bitrate 262, which is less than or equal to a maximum total bandwidth 255 allowed by subscriber connection 157. Example processes used by maximum bitrate determination logic 260 to determine maximum transrater bitrate 262 and maximum total bandwidth 255 will now be described.

In some embodiments, maximum total bandwidth 255 is provisioned by the service provider and communicated to maximum bitrate determination logic 260, since the service provider knows the characteristics of every subscriber connection 157 and can thus derive a maximum subscriber bitrate. In other embodiments, maximum bitrate determination logic 260 communicates with the subscriber equipment (e.g., the DHCT 180, a cable modem, a DSL modem) in order to determine maximum total bandwidth 255. For example, one embodiment of maximum bitrate determination logic 260 requests previously gathered error statistics from the subscriber equipment, relating to communication at different bitrates. The maximum bitrate might be determined as the rate at which a threshold number of errors occur. Another example embodiment of determination logic 260 initiates a test in which the bitrate on subscriber connection 157 is increased until a threshold number of errors occur, and that bitrate is used as the maximum total bandwidth 255. Other mechanisms for determining the maximum bandwidth supported by a subscriber connection 157 will be understood by a person of ordinary skill in the art, and such mechanisms are intended to be within the scope of this disclosure.

If transrater 160 shares bandwidth with other types of streams, maximum bitrate determination logic 260 initially sets maximum transrater bitrate 262 to a value which is less than maximum total bandwidth 255, thus leaving room for other streams. In some embodiments, this maximum transrater bitrate 262 is fixed, but in other embodiments, transrater 160 accepts and responds to changes in demand for bandwidth on the subscriber connection or to changes in performance on the subscriber connection. An embodiment using a fixed maximum bitrate will now be described in connection with FIG. 4. Another embodiment using a maximum bitrate which can vary will be discussed later.

Figure 4:
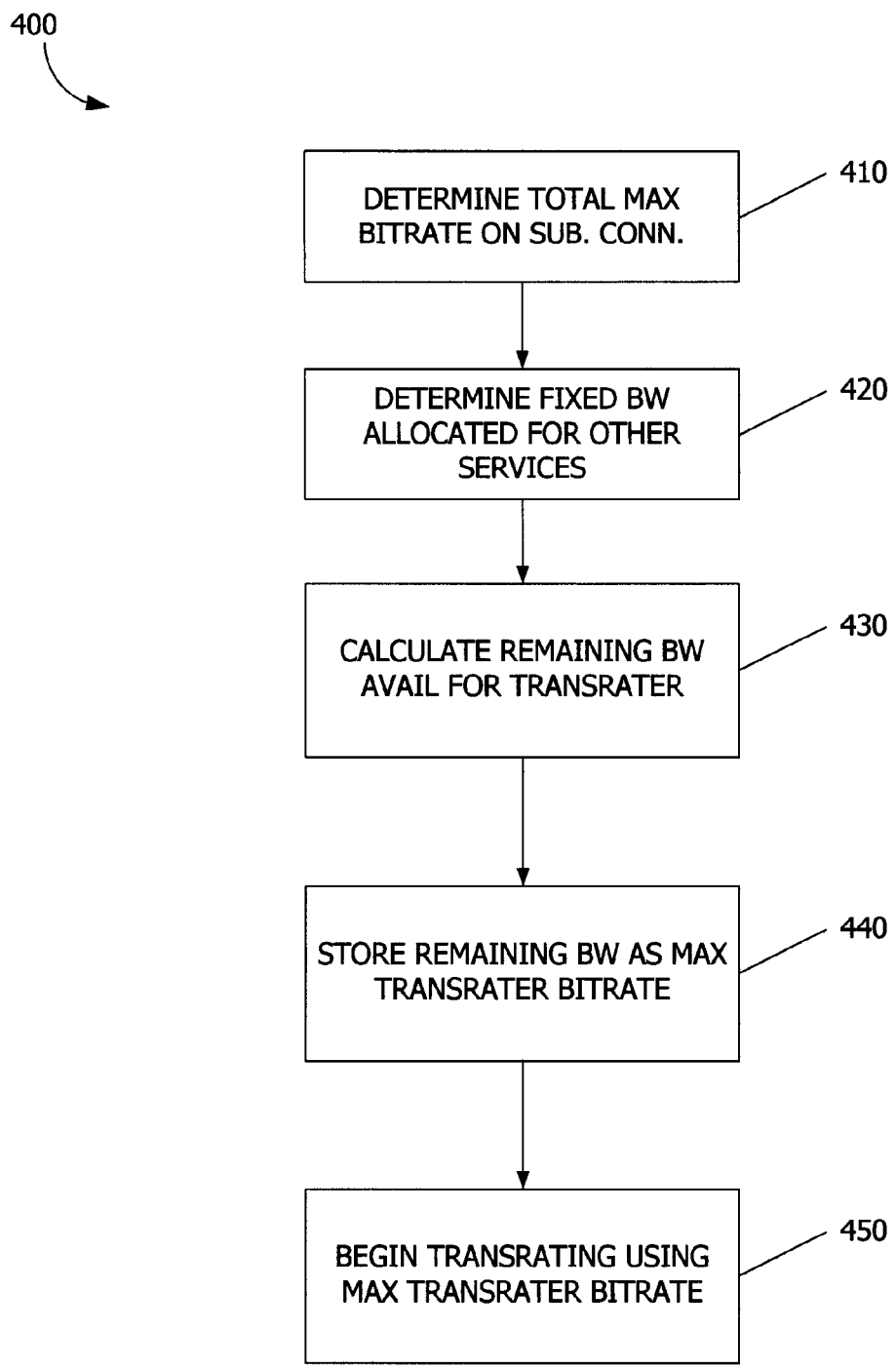
FIG. 4 is a flowchart describing an example method performed by the transrater from FIGS. 1 and 2, in which the maximum specified bitrate is fixed.

FIG. 4 is a flowchart describing an example method performed by transrater 160, in which the maximum specified bitrate 262 is fixed. The process 400 begins at block 410, where the total maximum bandwidth allowed on subscriber connection 157 is determined. Next, at block 420, the fixed amount of bandwidth allocated for other services is determined. Block 430 then calculates the remaining bandwidth available for transrater 160, taking into account the fixed bandwidth allocated for data. At block 440, this remaining bandwidth is stored as maximum transrater bitrate 262. Next, at block 450, transrater 160 begins transrating transratable media streams 215 to keep the combined re-rated bitrate as close to maximum transrater bitrate 262 as possible without exceeding this maximum.

The embodiments illustrated in FIG. 4 allow a service provider to guarantee a subscriber a fixed amount of bandwidth for services such as data and voice. The provider can also guarantee a specific number of media streams, since the provider can determine how many media streams can fit into the remaining bandwidth. For example, with a subscriber connection 157 that supports a total maximum bitrate of 25 Mbits/s, the service provider can allocate 5 Mbits/sec for data and leave 20 Mbits/s for media, which (at the current time) translates roughly to 1 high-definition (HD) stream and 2 standard-definition (SD) streams.

Figure 5:
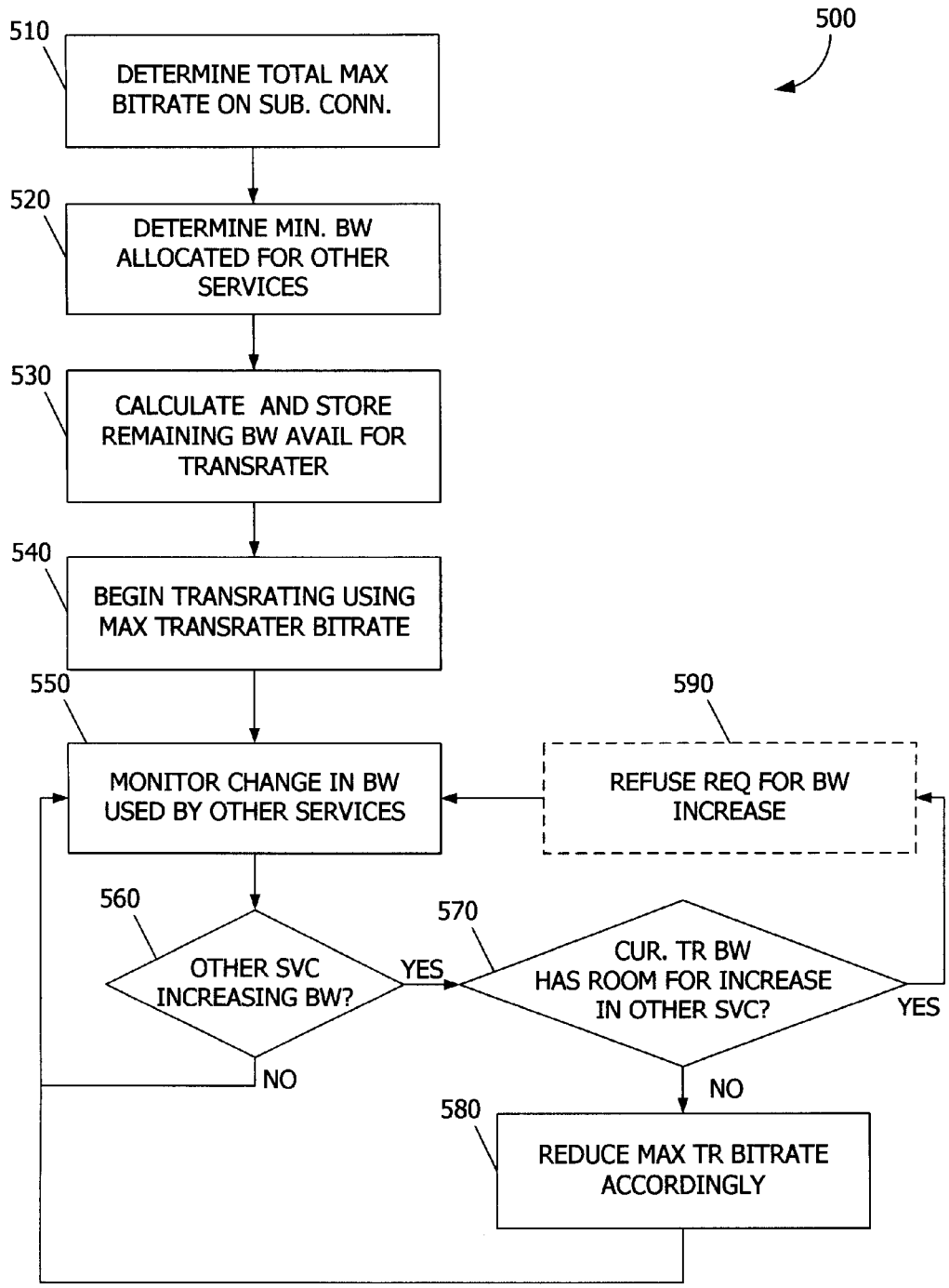
FIG. 5 is a flowchart describing an example method performed by the transrater from FIGS. 1 and 2, in which the maximum specified bitrate can vary over time.

FIG. 5 is a flowchart describing an example method performed by transrater 160, in which the maximum specified bitrate 262 can vary over time, depending on how subscriber connection 157 is used by other services. The process 500 begins at block 510, where the total maximum bandwidth allowed on subscriber connection 157 is determined. Block 520 then determines a minimum amount of bandwidth to be allocated for other services (e.g., data, voice, etc.). At block 530, the remaining bandwidth available for transrater 160 is determined, taking into account the minimum reserved for other services, and stored. At block 540, transrater 160 begins transrating transratable media streams 215 to keep the combined re-rated bitrate as close to maximum transrater bitrate 262 as possible without exceeding this maximum. Processing continues at block 550, where a change in the amount of bandwidth in use by, or requested by, other services is monitored. When a change is detected, block 560 determines if the other service bandwidth in use by the other service is an increase, and if so, block 570 examines the amount of bandwidth currently being produced by transrater 160. If the bandwidth currently produced by the transrater is less than the total allocated to transrater 160, and leaves enough room for an increase in other-service bandwidth, then block 580 reduces maximum transrater bitrate 262. That is, the bandwidth allocated to transrater 160 is reduced, leaving that bandwidth available for use by other services. In some embodiments, this action is communicated in block 590 to the other service which requested the bandwidth, which can be viewed as granting a request for bandwidth from the other service. In other embodiment, the other service is unaware of the behavior of transrater 160.

Figure 6:
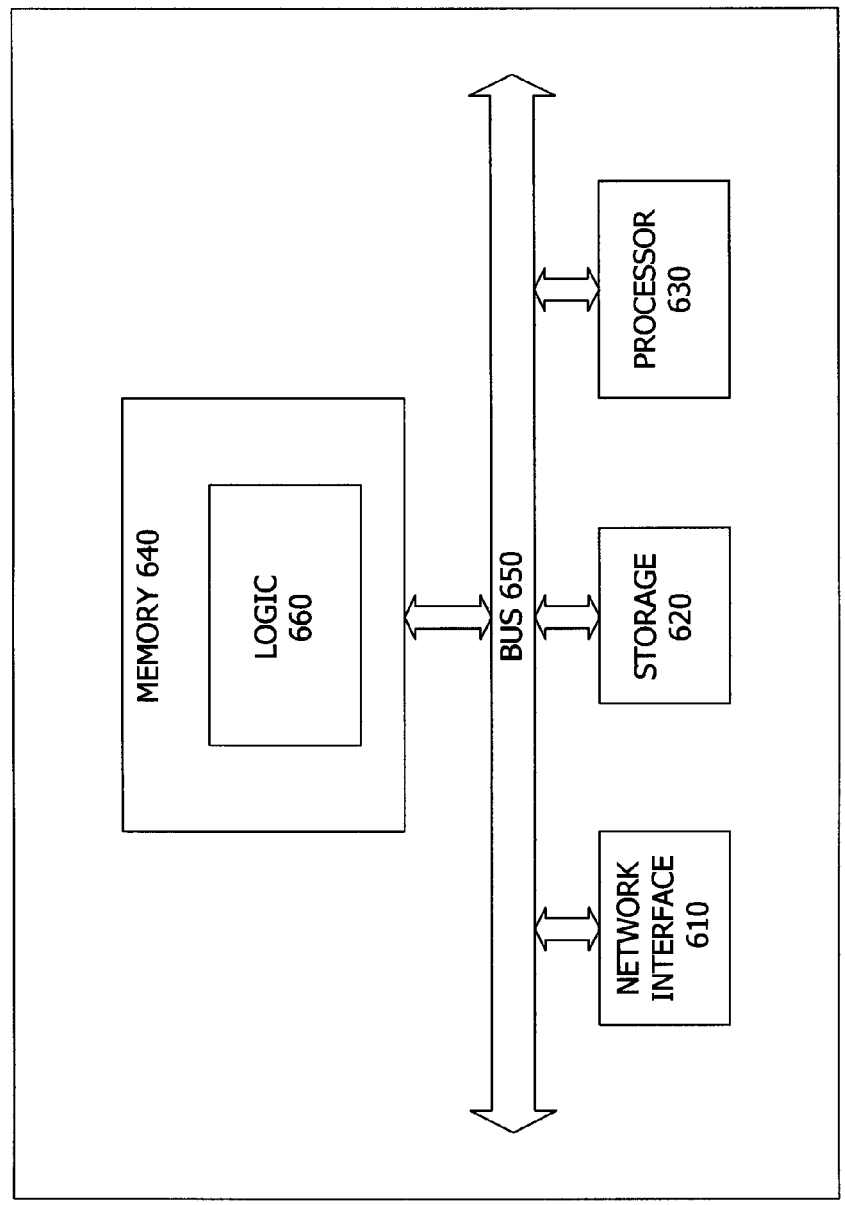
FIG. 6 is a block diagram showing selected components of an example transrater from FIG. 1 which implements various embodiments of systems and methods of adjusting bandwidth among multiple media streams, disclosed herein.

FIG. 6 is a block diagram showing selected components of an example transrater 160 which implements systems and methods of adjusting bandwidth among multiple media streams, disclosed herein. Transrater 160 comprises: a network interface 610; a storage device 620; a processor 630; and memory 640. These components are coupled by a bus 650. Omitted from FIG. 6 are a number of conventional components, known to those skilled in the art, that are unnecessary to explain the operation of the systems and methods of differentiated requests for network access disclosed herein. Residing in memory 640 is logic 660, which contains instructions that are executed by processor 630 to implement systems and methods of adjusting bandwidth among multiple media streams, for example, the systems and methods illustrated in FIGS. 2-5.

The systems and methods illustrated in FIGS. 2-5 can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), or a system in package (SiP).

The systems and methods illustrated in FIGS. 2-5 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium would include (but are not limited to) the following: a random access memory (RAM); a read-only memory (ROM); a programmable read-only memory (PROM); an erasable programmable read-only memory (EPROM); a flash memory; a hard disk; a compact disk read-only memory (CD-ROM); a digital video disk (DVD); and a flash drive.

The flow charts, messaging diagrams, state diagrams, and/or data flow diagrams herein provide examples of the operation of logic 660 according to an embodiment of the present invention. Alternatively, these diagrams may be viewed as depicting actions of an example of a method implemented in logic 660. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The software components illustrated herein are abstractions chosen to illustrate how functionality is partitioned among components in some embodiments of a system and method persistent searches. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by systems and methods of adjusting bandwidth among multiple media streams are described herein in terms of code and data, rather than with reference to a particular hardware device executing that code. Furthermore, the systems and methods can be implemented in any programming language, and executed on any hardware platform.

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions can be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen and described to illustrate the principles of the disclosure and its practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of adjusting bitrate among multiple media streams delivered on a common subscriber connection, comprising:
   receiving information describing a maximum bitrate provisioned on the subscriber connection;
   receiving a plurality of media streams, each of the plurality of media streams utilizing a corresponding bitrate, and the plurality of media streams having a combined bitrate;
   determining, by a statistical multiplexer, in a real-time bitrate requirement for each of the plurality of media streams using statistical multiplexing and assigning at least one of the plurality of media streams, a new bitrate consistent with the determined real time bitrate requirement and the combined bitrate;
   adjusting, by the statistical multiplexer at the switch, the corresponding bitrate of the at least one of the plurality of media streams based on the assigned new bitrate by partially decoding and then re-encoding the at least one of the plurality of media streams, wherein adjusting the bandwidth further comprises generating complexity information comprising encoding level of the media stream; and
   sending the complexity information along with the adjusted bitrate to the statistical multiplexer, wherein the statistical multiplexer is configured to trade bandwidth between the plurality of media streams based on the complexity information, the real-time bitrate requirement, and the combined bitrate.

2. The method of claim 1, wherein the adjusting further comprises:
   adjusting the bitrate of each of the plurality of media streams so that the combined bitrate is related to the maximum bitrate provisioned on the subscriber connection.

3. The method of claim 1, wherein the adjusting further comprises:
   adjusting the bitrate of each of the plurality of media streams so that the combined bitrate approaches the maximum bitrate provisioned on the subscriber connection.

4. The method of claim 1, wherein the adjusting further comprises:
   adjusting the bitrate of the at least a portion of the plurality of media streams so that the combined bitrate is related to the maximum bitrate provisioned on the subscriber connection less a reserved bitrate provisioned on the subscriber connection.

5. The method of claim 1, further comprising receiving information describing a reserved bandwidth provisioned on the subscriber connection, wherein the adjusting further comprises adjusting the bitrate of the at least a portion of the plurality of media streams so that the combined bitrate is related to the maximum bitrate provisioned on the subscriber connection less the reserved bandwidth provisioned on the subscriber connection.

6. The method of claim 1, further comprising receiving information describing a change in reserved bandwidth on the subscriber connection, wherein the adjusting further comprises adjusting the bitrate of the at least a portion of the plurality of media streams so that the combined bitrate is related to the maximum bitrate provisioned on the subscriber connection less the reserved bandwidth on the subscriber connection.

7. A system of adjusting bitrate among multiple media streams delivered on a common subscriber connection, comprising:
a processor; and
a memory containing instructions executable by the processor, the processor when executing the instructions operable to:
  determine a maximum bitrate provisioned on the subscriber connection at a switch, wherein the switch is configured to receive a plurality of media streams, each of the plurality of media streams utilizing a corresponding bitrate, the plurality of media streams having a combined bitrate;
  determine a real-time bitrate requirement for each of the plurality of media streams using statistical multiplexing and assign at least one of the plurality of media streams a new bitrate consistent with the determined real time bitrate requirement and the combined bitrate;
  adjust the bitrate of the at least one of the plurality of media streams based on the assigned new bitrate, by partially decoding and then re-encoding the at least one of the plurality of media streams;
  generate complexity information comprising encoding level of the at least one of the plurality of media streams; and
  send the generated complexity information along with the adjusted bitrate to the statistical multiplexer, wherein the statistical multiplexer is configured to trade bandwidth between the plurality of media streams based on the complexity information, the real-time bitrate requirement, and the combined bitrate.

8. The system of claim 7, wherein the processor is further configured to communicate with subscriber equipment coupled to the subscriber connection.

9. The system of claim 7, wherein the processor is further configured to retrieve error statistics from subscriber equipment coupled to the subscriber connection.

10. The system of claim 7, wherein the processor is further configured to initiate a test of subscriber equipment coupled to the subscriber connection.

11. The system of claim 7, wherein the processor is further configured to adjust the bitrate of each of the plurality of media streams so that the combined bitrate is related to the maximum bitrate provisioned on the subscriber connection.

12. The system of claim 7, wherein the processor is further configured to adjust the bitrate of each of the plurality of media streams so that the combined bitrate matches the maximum bitrate provisioned on the subscriber connection.

13. The system of claim 7, wherein the processor is further configured to adjust the bitrate of at least a portion of the plurality of media streams so that the combined bitrate is related to the maximum bitrate provisioned on the subscriber connection less a reserved bitrate provisioned on the subscriber connection.

14. A system of adjusting bitrate among multiple media streams delivered on a common subscriber connection, comprising:
a plurality of transrating engines, each receiving one of a plurality of media streams each having a corresponding bitrate, wherein at least one of the plurality of transrating engines is configured to:
  partially decode and then re-encode the corresponding one of the plurality of media streams based on a an adjusted bitrate,
  generate complexity information comprising encoding level of the re-encoded one of the plurality of media streams, and
  send the complexity information to a statistical rate controller; and
the statistical rate controller configured to determine in the real-time bitrate requirement for each of the plurality of media streams using statistical multiplexing and to inform each of the plurality of transrating engines as to the corresponding adjusted bitrate, wherein the statistical rate controller is further configured to determine the adjusted bitrate of the one of the plurality of media streams by trading bandwidth between the plurality of media streams based on the complexity information such that the combined bitrate of the plurality of media streams output by the statistical rate controller is less than a maximum bitrate supported on the subscriber line.

15. The system of claim 14, wherein statistical rate controller is configured to communicate with subscriber equipment coupled to the subscriber connection.

16. The system of claim 14, wherein the statistical rate controller is configured to retrieve error statistics from subscriber equipment coupled to the subscriber connection.

17. The system of claim 14, wherein the statistical rate controller is configured to initiate a test of subscriber equipment coupled to the subscriber connection.

18. The system of claim 14, wherein the plurality of transratinq engines are configured to adjust the bitrate of the at least one of the plurality of media streams so that the combined bitrate is related to the maximum bitrate provisioned on the subscriber connection.

19. The system of claim 14, wherein the plurality of transratinq engines are configured to adjust the bitrate of the at least one of the plurality of media streams so that the combined bitrate matches the maximum bitrate provisioned on the subscriber connection.

20. The system of claim 14, wherein the plurality of transratinq engines are configured to adjust the bitrate of at least a portion of the plurality of media streams so that the combined bitrate is related to the maximum bitrate provisioned on the subscriber connection less a reserved bitrate provisioned on the subscriber connection.

* * * * *